(12) United States Patent
Zeng et al.

(10) Patent No.: US 7,403,492 B2
(45) Date of Patent: Jul. 22, 2008

(54) METHOD TO SUPPORT MULTICAST ROUTING IN MULTI-HOP WIRELESS NETWORKS

(75) Inventors: Surong Zeng, Altamonte Springs, FL (US); Heyun Zheng, Altamonte Springs, FL (US)

(73) Assignee: MeshNetworks, Inc., Maitland, FL (US)

( * ) Notice: Subject to any disclaimer, the term of this patent is extended or adjusted under 35 U.S.C. 154(b) by 614 days.

(21) Appl. No.: 11/122,545

(22) Filed: May 5, 2005

(65) Prior Publication Data

US 2006/0250999 A1 Nov. 9, 2006

(51) Int. Cl.
 *H04L 12/28* (2006.01)
 *H04L 12/66* (2006.01)
(52) U.S. Cl. .............. 370/254; 370/352; 370/390; 370/408
(58) Field of Classification Search ........... 370/389, 370/390; 709/238
 See application file for complete search history.

(56) References Cited

U.S. PATENT DOCUMENTS

| | | | |
|---|---|---|---|
| 6,269,085 B1 * | 7/2001 | Provino et al. ............... | 370/256 |
| 6,807,165 B2 | 10/2004 | Belcea | |
| 6,873,839 B2 | 3/2005 | Stanforth | |
| 6,990,075 B2 * | 1/2006 | Krishnamurthy et al. .... | 370/236 |
| 7,117,273 B1 * | 10/2006 | O'Toole et al. ............. | 709/252 |
| 7,310,335 B1 * | 12/2007 | Garcia-Luna-Aceves et al. ................ | 370/390 |
| 2001/0034793 A1 | 10/2001 | Madruga | |
| 2002/0058502 A1 | 5/2002 | Stanforth | |
| 2002/0062388 A1 * | 5/2002 | Ogier et al. ................. | 709/238 |
| 2003/0227934 A1 * | 12/2003 | White et al. ................. | 370/432 |
| 2004/0170184 A1 * | 9/2004 | Hashimoto .................. | 370/401 |
| 2004/0218582 A1 * | 11/2004 | Kennedy et al. ............. | 370/351 |
| 2007/0291679 A1 * | 12/2007 | Kawakami et al. .......... | 370/328 |

OTHER PUBLICATIONS

D. Estrin, et al., "PIM-SM: Protocol Specification," RFC 2362.
S. Deering et al., "PIM v2 DM Specification," Internet Draft.
T. Ballardie, "Core Based Trees (CBT) Multicast Routing Architecture," RFC 2001.
D. Waitzman et al., "Distance Vector Multicast Routing Protocol," RFC 1075.
J. Moy, "Multicast Extensions to OSPF," RFC 1584.
E.M. Royer and C.E. Perkins, "Multicast Operation of the AdHoc On-Demand Distance Vector Routing Protocol," MobiCom '99, Seattle, WA, Aug. 1999.
S. Lee, W. Su and M. Gerla, "On-Demand Multicast Routing Protocol in Multihop Wireless Mobile Networks," Volumen 7, Issue 6, Dec. 2002.
C.E. Perkins, E.M. Belding-Royer, "Ad Hoc On-Demand Distance Vector (AODV) Routing," RFC, 2003.

* cited by examiner

*Primary Examiner*—Hasssan Kizou
*Assistant Examiner*—Brandon Renner
(74) *Attorney, Agent, or Firm*—Randi L. Karpinia; Joseph J. Buczynski

(57) ABSTRACT

A system and method for supporting multicast in highly dynamic wireless multi-hop networks, such as ad-hoc networks, with good scalability. The system and method provide a multicast routing algorithm to work in wireless ad-hoc networks without any fixed infrastructure nodes present. In doing so, the system and method provide a technique to build a multicast source specific tree on demand, while using a core source node to limit routing overhead. The system and method further provide a repair process to reduce the latency of discovery of topology change, employ a node sequence number mechanism to differentiate between upstream nodes and downstream nodes on the multicast tree in the repair process, and provide an active joining process to reduce the latency of discovery of membership change.

17 Claims, 2 Drawing Sheets

US 7,403,492 B2

METHOD TO SUPPORT MULTICAST ROUTING IN MULTI-HOP WIRELESS NETWORKS

BACKGROUND OF THE INVENTION

1. Field of the Invention

The present invention relates to a system and method for a multicast routing algorithm for multi-hop wireless networks, such as ad-hoc networks.

2. Description of the Related Art

In recent years, a type of mobile communications network known as an "ad-hoc" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", granted on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", granted on Oct. 19, 2004, and in U.S. Pat. No. 6,873,839 entitled "Prioritized-Routing for an Ad-Hoc, Peer-to-Peer, Mobile Radio Access System", granted on Mar. 29, 2005, the entire content of each being incorporated herein by reference.

Multicasting is a more efficient method of supporting group communication than unicasting or broadcasting, as it allows transmission and routing of packets to multiple destinations using fewer network resources. With the advent of widespread deployment of wireless networks, the fast-improving capabilities of mobile devices, and an increasingly sophisticated mobile work force worldwide, content and service providers are increasingly interested in supporting multicast communications over wireless networks. As more and more applications and network control protocols require multicast support, multicast routing algorithms are necessary in mobile wireless multi-hop ad-hoc networks to support high efficiency in traffic distribution for multiple users in a network.

None of the existing ad hoc multicast routings are suitable for wireless ad-hoc networks with high dynamics with reasonably good scalability. The proposed Ad Hoc On-demand Distance Vector Multicast Routing Protocol (AODVMRP) deals with multicast support in the wireless ad-hoc networks without fixed infrastructure nodes with high dynamics. Compared to other existing multicast routing algorithms for wireless networks, the proposed algorithm can support better scalability and dynamics for wireless ad-hoc networks.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
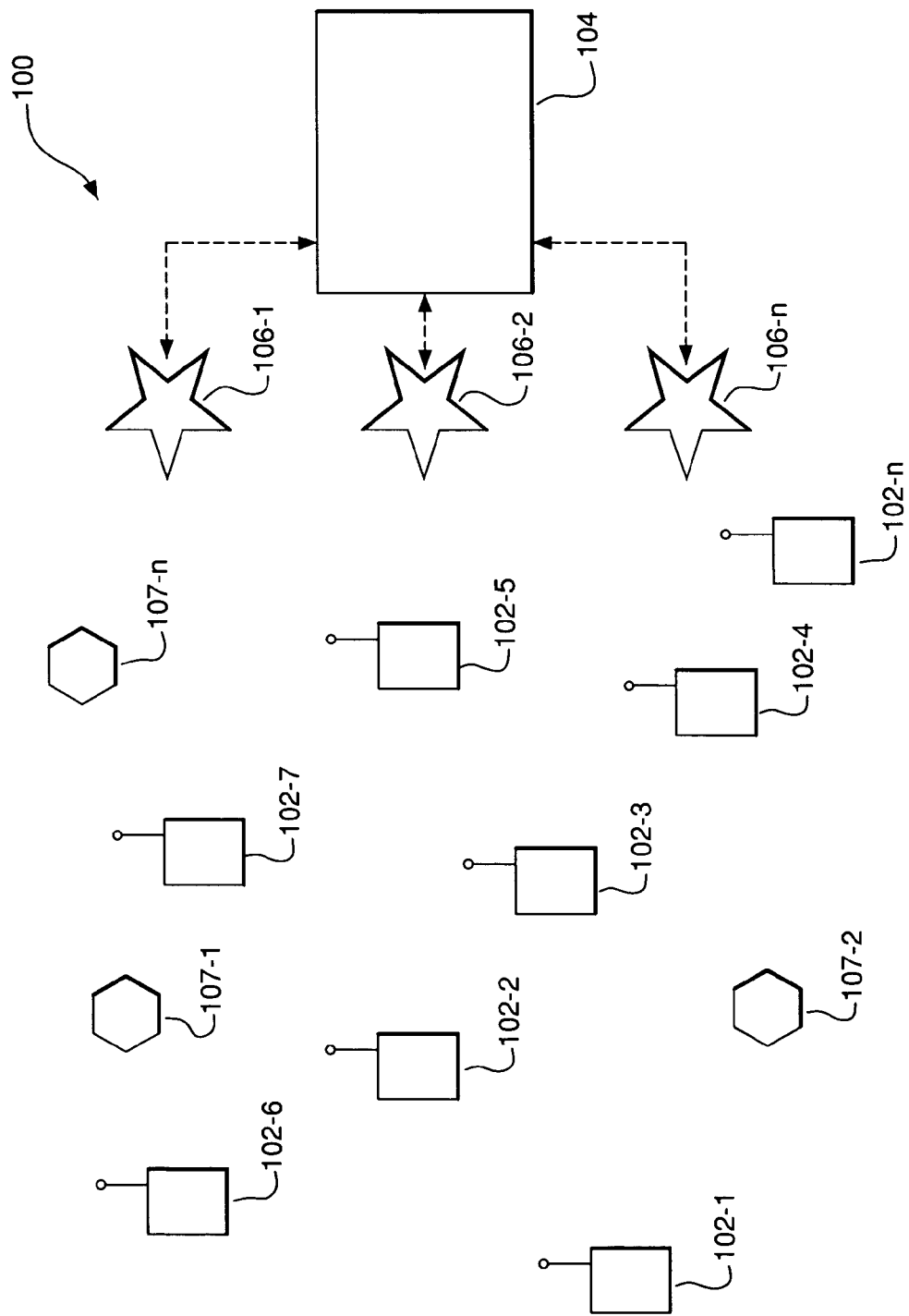
FIG. 1 is a block diagram of an example ad-hoc wireless communications network including a plurality of nodes employing a system and method in accordance with an embodiment of the present invention.

FIG. 1 is a block diagram illustrating an example of an ad-hoc packet-switched wireless communications network 100 employing an embodiment of the present invention. For purposes of this application, the term "ad-hoc network" refers to a network where the topology and the behavior of the nodes are arbitrary. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, ... 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, which is incorporated herein by reference, and in U.S. Pat. Nos. 7,072,650, 6,807,165 and 6,873,839, referenced above.

Figure 2:
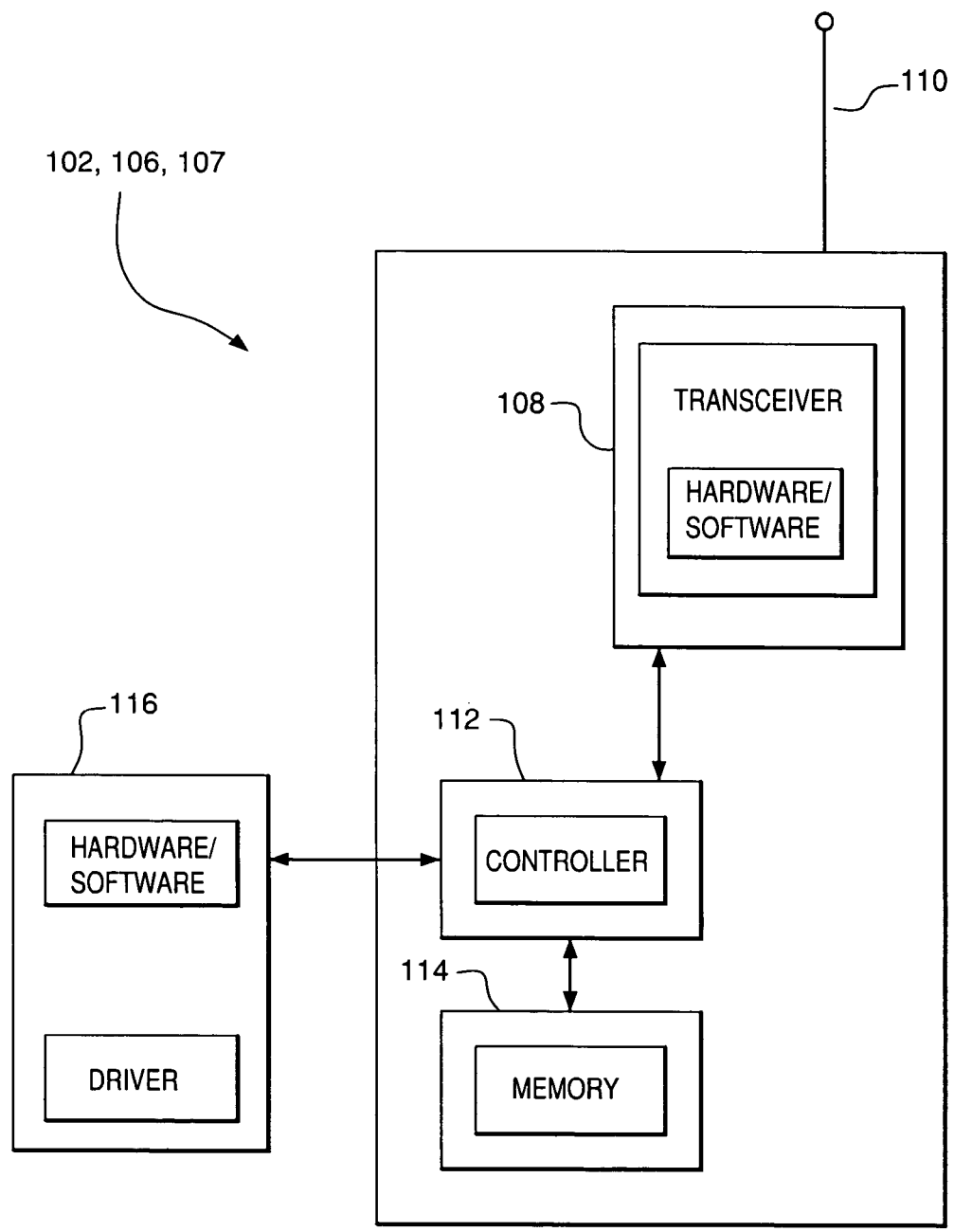
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

Routing Tables

Each node in the network maintains a unicast routing table. Each entry in the unicast routing table records information including:

Destination Address
Destination Node Sequence Number
Routing Metrics to Destination
Next Hop
Lifetime As will now be discussed in detail, the present invention provides a system and method for supporting multicast in highly dynamic ad-hoc networks with good scalability, which can be achieved by a multicast routing algorithm to work in wireless ad-hoc networks without any fixed infrastructure nodes present. The present invention further provides a system and method to build a multicast source specific tree on-demand by using a core source node to limit routing overhead, and a repair process to reduce the latency of discovery of topology change. The system and method further employs a node sequence number mechanism to differentiate between upstream nodes and down stream nodes on the multicast tree, and avoid obsolete route information in the repair process. The system and method further provides an active joining process to reduce the latency of discovery of membership change.

A number of multicast algorithms for wired networks have been designed in recent decades. Protocol independent multicast—sparse mode (PIM-SM) as described in "PIM-SM: Protocol Specification", RFC 2362, by D. Estrin et al. and core based tree (CBT) as described in "Core Based Trees (CBT) Multicast Routing Architecture", RFC 2201, by T. Ballardie, both build shared trees among group members to support multicast in large scale static networks. Protocol independent multicast—dense mode (PIM-DM) as described in "PIM v2 DM Specification", Internet Draft, by S. Deering, distance vector multicast routing protocol (DVMRP) as described in "Distance Vector Multicast Routing Protocol", RFC 1075, by D. Waitzman et al, and multicast open shortest path first (MOSPF) as described in "Multicast Extensions to OSPF", RFC 1584, by J. Moy, all build source specific trees between sources and group members to support multicast in small scale static networks. None of them takes into consideration the high dynamics of mobile networks. They are not suitable for mobile wireless ad-hoc networks without any infrastructure nodes deployed.

A number of multicast algorithms for wireless ad hoc networks have been proposed in the last few years. The tree based multicast algorithm for wireless ad hoc networks includes the Multicast Ad Hoc On-Demand Distance Vector (MAODV) protocol which is described in "Multicast Operation of the Ad-Hoc On-Demand Distance Vector Routing Protocol", MobiCom'99, August 1999, by E. M. Royer and C. E. Perkins. MAODV dynamically builds a tree rooted at the multicast group leader. It proactively builds the multicast shared tree rooted at the elected multicast group leader. Due to the high dynamics in wireless ad-hoc networks, this algorithm is very fragile in regards to maintaining the tree, and has difficulty dealing with the splitting and merging of multicast trees.

The mesh based multicast algorithms include the On-Demand Multicast Routing Protocol (ODMRP) which is described in "On-Demand Multicast Routing Protocol in Multihop Wireless Mobile Networks", Mobile Networks and Applications, Volume 7, Issue 6, December 2002, by S. Lee, W. Su and M. Gerla. ODMRP dynamically establishes and maintains a mesh by the source on demand. It can support the high dynamics for wireless ad-hoc networks. However, its overhead for maintaining the multicast mesh is relatively high, which limits its scalability.

The meshed tree based multicast algorithm Core Assisted Mesh Protocol (CAMP), which is described in US patent application US2001/0034793 A1, Oct. 25, 2001, uses multiple cores to mesh the shared tree to connect all the group members. Its cores are dynamically elected, hence it cannot build the meshed tree in a very short time to support the fast topology change. Additionally, the cores are meshed to each other through the mobile nodes in the wireless network, hence the meshing among cores are vulnerable to the mobility. It also has the similar drawback as MAODV because they both proactively build and maintain the multicast tree and/or mesh no matter whether multicast traffic exists or not.

As discussed in the Background section above, none of the existing ad-hoc multicast routings are suitable for wireless ad-hoc networks with high dynamics with reasonably good scalability. Hence, as will now be described, the Ad Hoc On-demand Distance Vector Multicast Routing Protocol (AODVMRP) according to the present invention provides multicast support in the wireless ad-hoc networks without fixed infrastructure nodes with high dynamics. Compared to other existing multicast routing algorithms for wireless networks, the proposed algorithm can support better scalability and dynamics for wireless ad-hoc networks.

In the system and method according to the present invention, core source specific trees are dynamically built and maintained for each multicast group. When a source node wants to send traffic to a multicast group and it does not have a source specific tree to reach all the intended group members, it can initiate a multicast tree discovery process. In order to build the source specific multicast tree, the source node broadcasts a routing control packet route request (RREQ) with the intended multicast group as the destination. All the multicast group member nodes receiving the RREQ respond with route replies (RREPs) to the source node along the reverse routes. All the nodes receiving the RREQ also forward it by rebroadcasting it to the neighborhood if the time-to-live (TTL) for this RREQ does not expire. Ultimately, the RREQ reaches all the multicast group members in the network, and the source node receives RREPs back from them. By exchanging the RREQs and RREPs, the source specific tree is built dynamically.

The source node periodically broadcasts the RREQ to discover new group members and new topology changes, and to refresh its source specific multicast tree. In order to limit the RREQ flooding effect, only limited sources periodically flood the RREQ in the network. These sources are dubbed core source nodes. Each node determines in a distributed manner whether it is a core source according to some criteria, which can be the distance to the closest core source, the number of core sources in the network, and its own MAC address and the MAC address of the closet core source, etc. By limiting the number of core sources, the proposed protocol can reduce the flooding effect in the network, and improve the bandwidth utilization efficiency. By keeping a reasonably large number of core sources, it can maintain good connectivity among the multicast group members with route distances close to the optimal route distances.

In a network supporting multicast, a node is a multicast router if it is a member of the multicast tree. The multicast router maintains a multicast routing table in addition to the unicast routing table. Each entry in the multicast routing table records information including:

Multicast Group Address
Next Hops (to different branches on the multicast tree)
Core Source List
Forwarding Node Flag The Next Hops field is a linked list of structures, each of which contains the following fields:

Next Hop Address
Lifetime for this Next Hop
Activated Flag

The lifetime is extended by periodic refreshing action from the core source node to the group member. When the lifetime expires, the associated next hop entry should be deleted. Only a next hop with the active flag set can be used to forward the multicast traffic.

The Core Source List field records the core source nodes. It is a linked list of structures, each of which contains the following fields:

Core Source Address
Hop Count to the Core Source
Routing Metrics to the Core Source
Activated Flag
Lifetime for this Core Source The Core Source Address records the address for the core source node which is responsible for building and maintaining the source specific multicast tree for this multicast group. The Hop Count to the Core Source and the Routing Metrics to the Core Source fields record the hop count and routing metrics to the core source respectively. This core source list is sorted by the hop count, or the routing metrics, or the combination of other criteria, to the core source. The Activated Flag indicates whether this core source has been activated by the multicast traffic from this source node. The activated flag is unset when the core source entry is initially created, and it is set by the first multicast packet from this core source. The Lifetime for this Core Source field records the expiration time for this core source. It is extended periodically by related routing control packets. When this timer expires, this core source entry should be deleted from the core source list. The Lifetime for this multicast entry records the expiration time for this entry. When it is due, this entry should be deleted from the table.

The Forwarding Node flag indicates whether this node is a forwarding member node for this multicast group.

Multicast Core Source Election

The decision for core source election is made in a distributed manner, by each source node in the multicast group. If the total number of activated core sources is smaller than MULTICAST_CORE_SRC_NUM_THRESHOLD, the source node should be a core source. If the total number of activated core sources is larger than MULTICAST_CORE_SRC_NUM_THRESHOLD, then it should check activated core sources to determine whether it can become a core source according to the core source election criteria which can be the distance to the closest core source, the number of core sources in the network, and its own address and the address of the closest core source, etc. One example is described here: if the number of hop counts from this node to one of the activated core source nodes is less than MULTICAST_CORE_SRC_DISTANCE_THRESHOLD, and the address of this node is larger than the address of the core source, then this node should not be a core source. Otherwise, it can be a core source. The decision to be a core source should be made when a node initially becomes a source node and when the periodic refresh timer for a core source node expires. The core source node determination criteria can be more than the ones described above to adapt to the special multicast routing needs in different networks.

Multicast Tree Forming

The multicast tree is formed on-demand to connect multicast group members. Any node can send multicast traffic to the group. When a node becomes an active source node for a multicast group, it should determine whether it should be a core source according to the rule described in the last section. If it is a core source node, it should initiate a multicast tree discovery process to the multicast group by broadcasting a RREQ with time-to-live (TTL) set as the NET_DIAMETER. The packet carries information including:

Source Address (Originating node address)
Source Node Sequence Number
Desired Multicast Group Address
Hopcount to the Source Node
Routing Metrics to the Source Node
TTL When the RREQ traverses the network, reverse routes are created on its way. The node sequence number mechanism is used to avoid the unicast route loop. It is proposed in the Ad Hoc On-Demand Distance Vector (AODV) protocol, as described by C. E. Perkins, E. M. Belding-Royer, and S. R. Das, in "Ad Hoc On-Demand Distance Vector (AODV) Routing", RFC, 2003, which is incorporated herein by reference for its explanation of the AODV protocol. The described system and method further modifies the usage of the node sequence number to differentiate between upstream nodes and downstream nodes on the multicast tree. The upsteam node should have fresher node sequence number for the core source node.

When a node in the network receives the RREQ, it determines whether it should respond to this RREQ. If the node is a multicast group member, it should respond to the RREQ with an RREP. The RREP carries information including:

Source Address
Desired Multicast Group Address

The group member node unicasts the RREP back to the core source node along the reverse route created by the RREQ. On the way back to the core source node, each node on the reverse route becomes a forwarding node of the multicast group. An intermediate node creates the multicast entry for this group by recording the multicast group address and core source node address, adding the node from which the RREP is received into the next hop list, and setting the activated flag. If the node is not the final destination of the RREP, it also should add the node to which the RREP should be forwarded in order to reach the core source node into the next hop list, set the activated flag, and forward the RREP back toward the initiating core source node. When a node becomes a forwarding node or a member node gets connected to the core source node, it may broadcast a Hello message to inform its neighborhood that the multicast group is active. The Hello message carries information including:

Source Address (the current node address)
Multicast Group Address

If a node is on multiple multicast group trees for different groups, it can carry multicast group addresses on a single Hello message, or alternatively, it can carry different group addresses in different Hello messages.

A node receiving the RREQ decreases the TTL value by 1. If the updated TTL value is larger than zero, i.e. it has not expired by falling to an expiration threshold value, the node rebroadcasts the updated RREQ no matter if it is a multicast group member or not.

When the RREQ traverses the whole network, reaching all the multicast group members in the network, and gets the RREPs back from all the members to the initiating core source node, the source specific tree rooted at the core source node is built, and it can be used to distribute the multicast traffic from the core source node and the non-core source node near the core source node.

Multicast Tree Maintenance

Refreshing

A source node may periodically broadcast a RREQ to the whole network to discover topology changes and membership changes in the network. Before a source initiates the periodical refreshing process, it should determine whether it is a core source node according the rule described in the previous section. If the node should not be a core source, it should not flood the whole network with the RREQ. Otherwise, if the node should indeed be a core source, it should broadcast the RREQ to the whole network to discover a new source specific tree so that the new topology changes and membership changes can be discovered. The process of refreshing the source specific multicast tree is similar to the initial source specific multicast tree form. The lifetimes for next hop entry and core source entry will be extended accordingly.

Pruning and Repair

Each node in the network monitors the link quality on each link between the node itself and its neighboring nodes. When a link breakage is detected, the node prunes the multicast branch connected by this link, invalidates the unicast routes using this link, and increments the sequence number for all lost destinations. If the node is not a multicast member node, it sends the route error (RERR) to the nodes that use this node to reach those lost destinations to invalidate the route to the lost core source node, and RERR is marked as "repair is needed". If the node is, in fact, a multicast group member node, the node checks whether this link is connected to the node which is the next hop to reach the core source node(s) by checking the unicast route table. If the link is connected to the next hop, the node may initiate a repair process without sending a RERR message depending on the core source traffic activity. If the last seen multicast traffic from this core source is shorter than the SOURCE_ACTIVITY_INTERVAL, then it can assume that the core source is still active, and the repair is necessary. The member node broadcast a RREQ to search a new route to the core source. The RREQ carries information including:

Source Address (the initiating node address)
Destination Address (the lost core source node address)
Destination Node Sequence Number (the lost core source node sequence number known by this initiating node)
Multicast Group Address In this repair process, only the core source node itself or a node with a fresh unicast route to the lost core source node can respond to the repair RREQ with a RREP. The node determines whether this is a fresh unicast route by comparing the destination node sequence number associated with the unicast route entry for the core source node and the destination node sequence number carried in the RREQ. This mechanism can stop the nodes on the downstream direction of the broken link from responding with obsolete routing information. If the node which receives the RREQ has an active route to the core source node with destination node sequence number larger than or equal to the one carried in the RREQ, the node is considered as the one with a fresh unicast route to the lost core source node, and can generate the RREP to the RREQ initiating node. The repair RREP message carries information including:

Source Address (the lost core source node address)
Source Node Sequence Number (the lost core source node sequence number)
Multicast Group Address
Hop Count to the Source Node (the hop count to the core source node)
Routing Metrics to the Source Node Upon receiving the repair RREP, each node should create/update the unicast route from the initiating node to the lost core source node, and create/update the multicast entry for the multicast group indicated by the multicast group address.

If no RREP is received in the preset waiting time, the member node initiating the repair process should generate a RERR to report the loss of the core source node, and the RERR is marked as "repair is not needed".

When a group member node receives a RERR with "repair is needed", it can initiate the repair process as described above without forwarding the RERR further. If a non-member node receives a RERR, it just forwards the RERR to its precursor nodes.

The repair process can reduce the latency of the node rejoining the source specific tree rooted at the lost core source node. Without the repair process, the node has to wait for the next refreshing process from the core source.

New Member Joining

When a new non-source member node is present in the network, it can wait for the next refreshing process from the core source node to join the source specific tree. In this case there would be a latency in joining the tree. Alternatively, the node may actively join the multicast group. It can do so by first listening to its neighborhood. If the node detects a Hello message with its intended multicast group address, it can broadcast a joining RREQ to join the multicast tree without waiting for the refreshing process. Any node on the tree can respond to the RREQ with a joining RREP. The joining RREP carries information including:

Source Address (the responding node address)
Core Source Address (the core source node that the responding node is connecting to)
Core Source Node Sequence Number (the sequence number for the core source node known by the responding node)
Hopcount to the Core Source (Hopcount to the core source node that the responding node is connecting to)
Routing metrics to the Core Source
Destination Address (the joining node address)
Desired Multicast Group If the responding node is on multiple multicast source trees rooted at different core source nodes, it can carry all the core source addresses in the same RREP. It may also choose to send multiple RREPs with each carrying the route information for one core source node.

The new member node may receive multiple RREPs from different nodes on the tree. It can choose the one with the best routing metrics, and send a multicast activation (MACT) message back to the responding node to activate the branch.

When the intermediate node receives the joining RREPs, it processes the message in the same way that it processes the regular RREP message. However, it should leave the activated flag for the next hop in the multicast entry unset, and the entry will be activated by the MACT message. The node cannot use the next hop entry to forward the multicast traffic until it is activated. The lifetime for the unactivated next hop is indicated in the Lifetime for this Next Hop field. When the lifetime expires, if the next hop entry is still not activated, this entry will be deleted from the next hop list.

By introducing the local repair process and active new member joining process, the periodical refresh timer can be increased to further reduce the routing overhead.

Multicast Traffic Forwarding and Duplicates Detection

Each core source node can start using the multicast tree to distribute multicast traffic only when the initial multicast tree discovery process is finished. Non-core source nodes can distribute the multicast traffic immediately on the multicast tree without the multicast tree discovery process.

All the nodes on the multicast tree accept non-duplicate packets, and forward them to all of the next hops for this multicast group other than the one from which the packets are received.

Each packet will carry a sequence number in its packet header for multicast/broadcast traffic duplicates detection. Each multicast tree member maintains a list to record the sequence numbers of packets it receives for each source. Every sequence number will be recorded in the list for a period equal to NET_TRAVERSAL_TIME. If a node receives a packet with a sequence number which is not seen within the NET_TRAVERSAL_TIME, it accepts the packet as a new packet, otherwise, it deletes the packet as a duplicate.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for supporting multicast in a multihop wireless network, the method comprising:
    establishing certain nodes in the network as core source nodes, wherein the establishing step comprises:
        determining whether a node should be a core source node for a multicast group, based on criteria comprising a number of activated core sources in the network, a multicast core source number threshold, a distance to a closest activated core source, a number of hop counts from the node to one of the activated core sources, an address of the node, and an address of the closest activated core source;
    engaging in a multicast tree discovery or refreshing process by operating at least one of the core source nodes to broadcast a route request (RREQ) message; and
    building the multicast tree or refreshing the multicast tree based on the RREQ message, and at least one route reply (RREP) message received by the at least one core source node from another node in response to the RREQ message.

2. The method of claim 1, wherein the RREQ message carries information including at least one of source address, source node sequence number, desired multicast group address, hop count to the source node, routing metrics to the source node, and time-to-live (TTL).

3. The method of claim 1, wherein the step of engaging in a multicast tree discovery process further comprises:
    receiving, at the core source node, the RREP message that is unicast along a reverse route to the core source node by the another node that is a multicast group member node that received the RREQ message and created the reverse route in response to the RREQ message.

4. The method of claim 3, wherein the reverse route includes at least one node, each of which becoming a forwarding node of a multicast group, such that a forwarding node is adapted to broadcast a hello message to inform its neighborhood that the multicast group is active, and the hello message carries information including a current node address and a multicast group address.

5. The method of claim 1, further comprising:
    refreshing the multicast tree by periodically broadcasting a RREQ message from the core source node.

6. The method of claim 1, further comprising:
    monitoring link quality of each link between a node and its neighboring nodes of the multicast tree; and
    detecting a link breakage between the nodes based on the monitored link quality.

7. The method of claim 6, further comprising:
    pruning a multicast branch connected by a broken link when a link breakage is detected; and
        repairing a broken link, wherein the repair comprises a node connected to the broken link broadcasting a repair RREQ message, a lost core source node or a node with a fresh unicast route to the lost core source receiving the repair RREQ message, and a receiving node transmitting a repair RREP message to the node initiating the repair.

8. The method of claim 1, further comprising enabling another node to join the multicast tree by performing the steps of:
    detecting a hello message including a multicast group address, at the node attempting to joint the multicast tree;
    broadcasting a joining RREQ message from the joining node in order to join the multicast tree; and
    transmitting a joining RREP message from any node on the multicast tree to shorten a new member joining latency.

9. The method of claim 1, wherein:
    the multicast tree includes a plurality of nodes, such that packets transmitted by the nodes in the multicast tree each carry a sequence number in a header to eliminate duplicate packets.

10. A multihop wireless communications network, comprising:
    a plurality of nodes, some of which being multicast source nodes; and
    a number of core source nodes that is less than a total number of multicast source nodes in the network, the core source nodes engaging in a multicast tree discovery or refreshing process by broadcasting route request (RREQ) messages and receiving route reply (RREP) messages in response to the RREQ messages, and then building or refreshing a multicast tree based on an exchange of the RREQ message and RREP messages, wherein:
    one of the nodes in the network is a core source node based on criteria comprising a number of activated core sources in the network, a multicast core source number threshold, a distance to a closest activated core source, a number of hop counts from the node to one of the activated core sources, an address of the node, and an address of the closest activated core source, such that:
    the number of active core source nodes is less than a core source threshold number;
    the number of hop counts from the node to closest activated core source node is larger than a hop count threshold number; or the number of hop counts from the node to an activated core source node is less than a hop count threshold number and the address of the node is larger than the address of the core source node.

11. The network of claim 10, wherein the RREQ message carries information including source address, source node sequence number, desired multicast group address, hop count to the source node, routing metrics to the source node, and (time-to-live) TTL.

12. The network of claim 10, wherein when a multicast group member node receives the RREQ message, the member node unicasts a RREP message to the core source node along a reverse route created by the RREQ message.

13. The network of claim 10, wherein each node
monitors a link quality of each link between a node and its neighboring nodes; and
detects a link breakage.

14. The network of claim 10 wherein each of the nodes performs the following operations:
detecting a link breakage between itself and another node;
pruning a multicast branch connected by a broken link when a link breakage is detected; and
repairing a broken link by broadcasting a repair RREQ message that is received by a lost core source node or a node with a fresh unicast route to the lost core source and the receiving node transmitting a repair RREP message to the node initiating the repair.

15. The network of claim 10, wherein any of the nodes joins a multicast tree by detecting a hello message, broadcasting a joining RREQ message, and receiving a joining RREP message that is transmitted by any node on the multicast tree that receives the joining RREQ message.

16. The network of claim 10, wherein packets transmitted by nodes in a multicast tree each carry a sequence number in a header to eliminate duplicate packets.

17. The network of claim 10, wherein a limited number of core source nodes broadcasting the RREQ message limits routing overhead.

* * * * *